Nov. 15, 1938.  E. B. CARSON  2,136,541
CLUTCH
Filed July 6, 1936   3 Sheets-Sheet 1
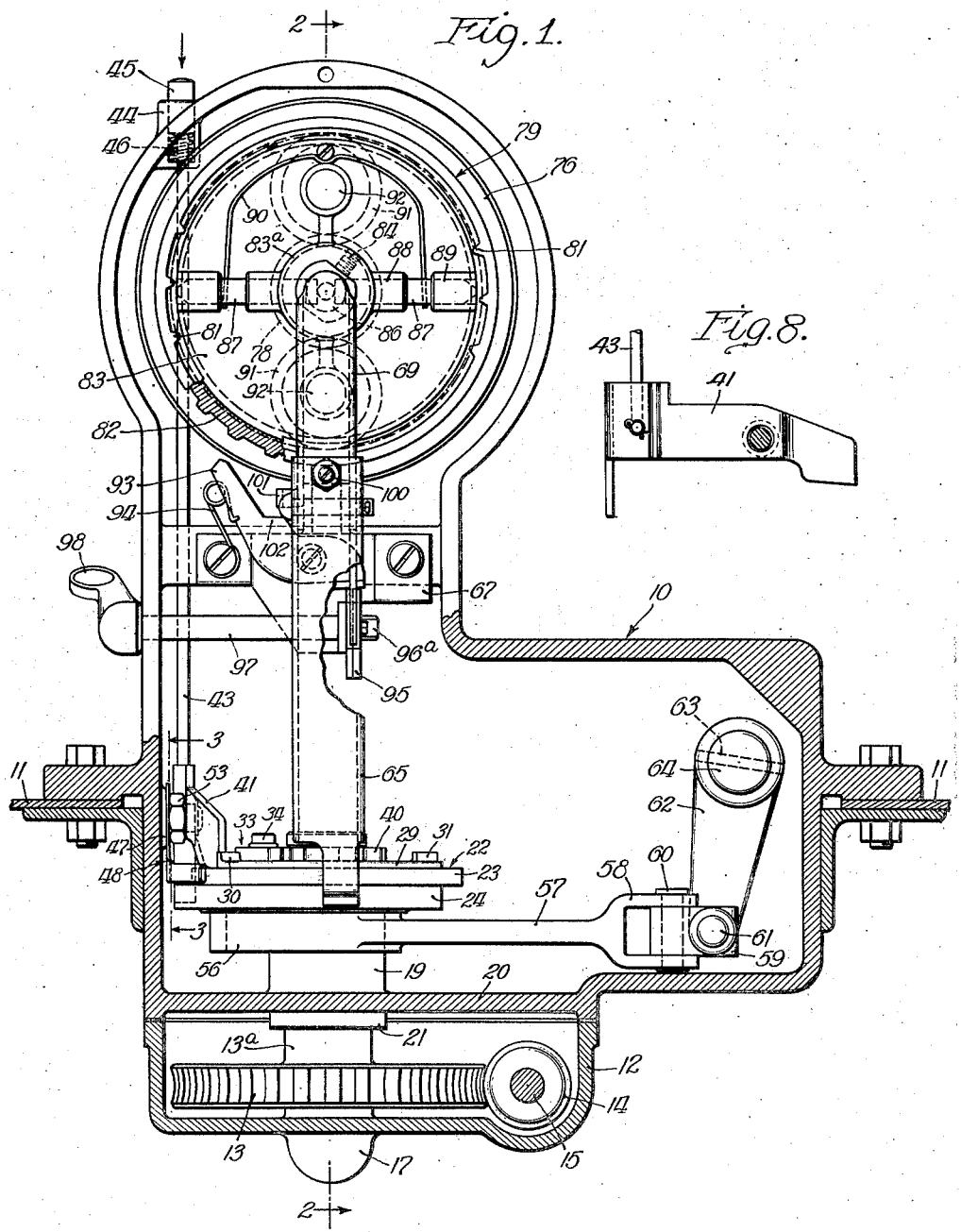
Inventor
Edward B. Carson
By:
Brown, Jackson, Boettcher & Dienner
Attys.

Nov. 15, 1938.  E. B. CARSON  2,136,541
CLUTCH
Filed July 6, 1936   3 Sheets-Sheet 2
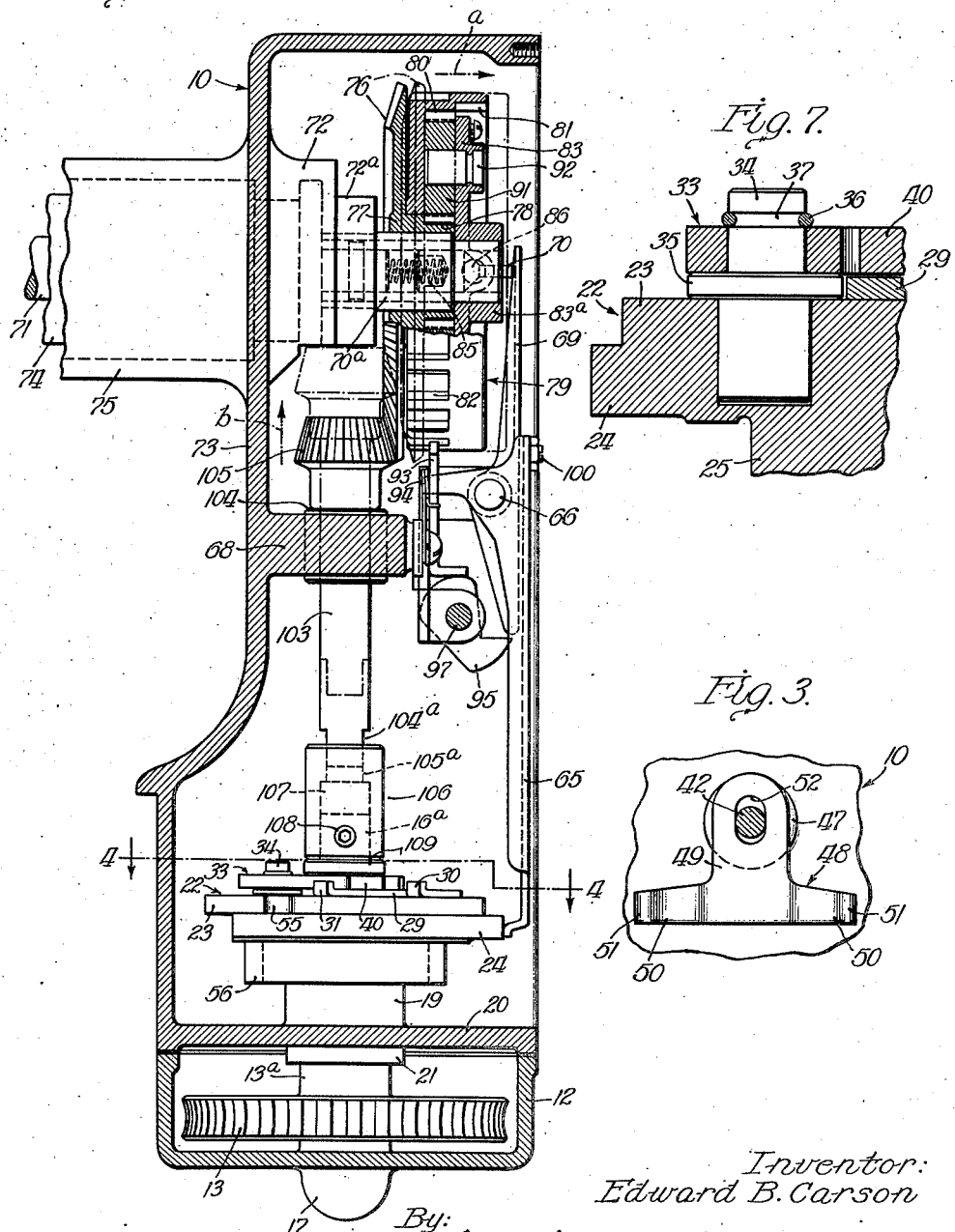
Inventor:
Edward B. Carson Nov. 15, 1938.   E. B. CARSON   2,136,541
CLUTCH
Filed July 6, 1936   3 Sheets-Sheet 3
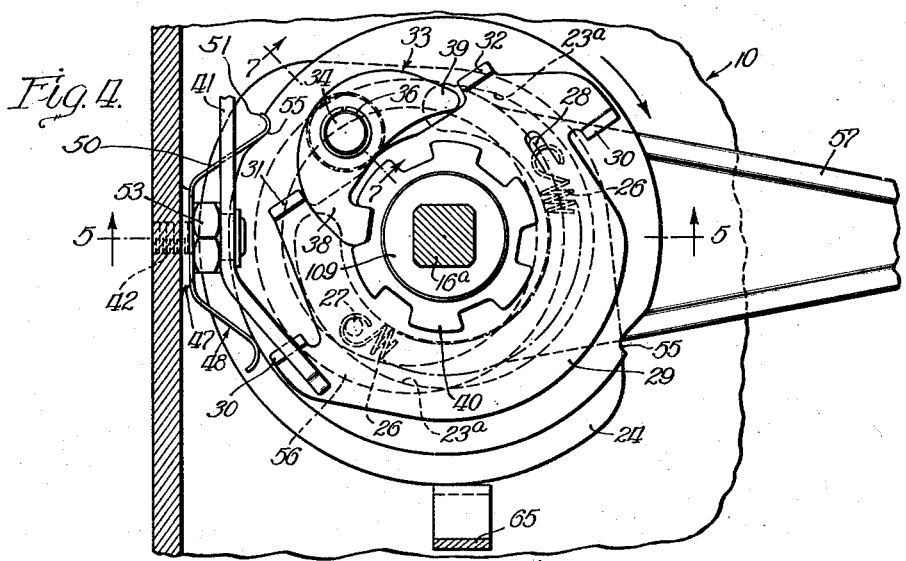
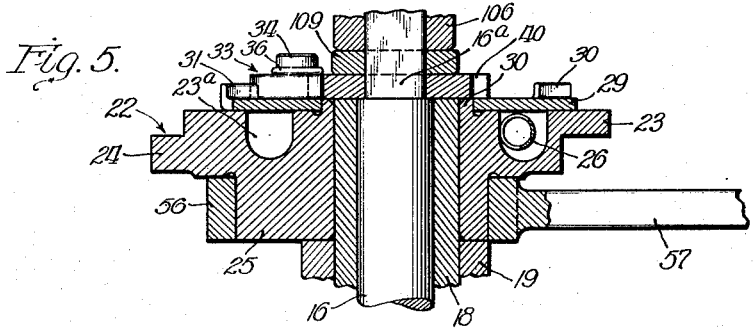
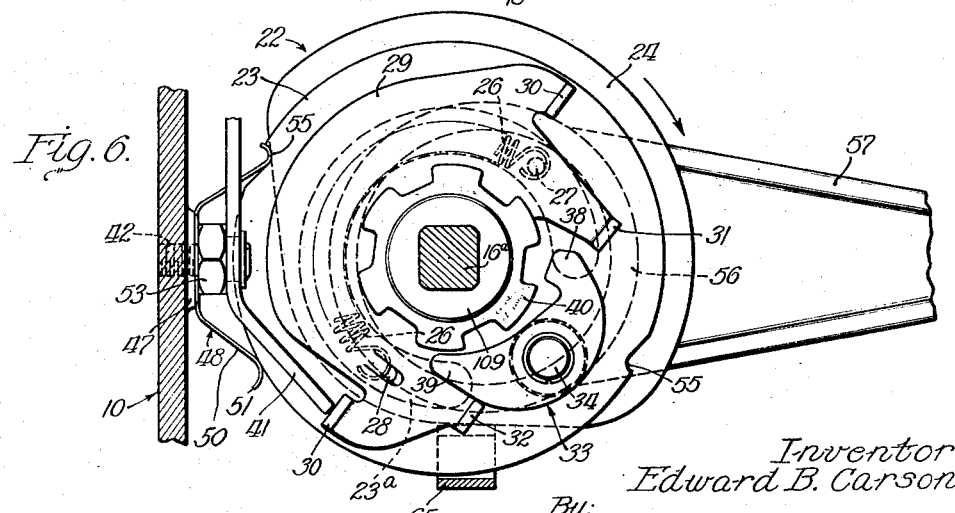
Inventor:
Edward B. Carson Patented Nov. 15, 1938

2,136,541

UNITED STATES PATENT OFFICE 2,136,541

CLUTCH

Edward B. Carson, Fort Myers, Fla.

Application July 6, 1936, Serial No. 89,139

5 Claims. (Cl. 192—28)

This invention relates to ironing machines, and has to do with a clutch and associated parts for controlling operation of the machine.

The clutch and associated parts of my invention are particularly suitable for use in an ironing machine comprising a rotating roll and a cooperating shoe movable to and from the roll and held in contact therewith under spring pressure. A machine of this general type is disclosed in the patent to Rudolph W. Janda, for Ironing Machine, No. 2,026,345, issued December 31, 1935. While the clutch and associated parts of my invention are particularly suitable for use in an ironing machine of this general type, the machine to which my invention is shown as applied, by way of example, differs in certain respects from the machine of said patent, as will hereinafter more fully appear.

Among the objects of my invention are the provision of a clutch and associated parts of comparatively simple and improved construction and operation, which assures accuracy in operation of the machine and effectively eliminates objectionable noises due to clicking or chattering of the clutch parts. A further object is to provide a clutch assembly and associated parts so related that the assembly may be removed and replaced as a unit, with expedition and facility. Further objects and advantages will appear from the detail description.

In the drawings:

Figure 1 is a front view, partly broken away and in section, of the gear housing and adjacent portions of an ironing machine, with the cover plate of the housing removed, showing a clutch assembly and associated parts embodying my invention as applied;

Figure 2 is a sectional view taken substantially on line 2—2 of Figure 1 through the gear housing, the clutch assembly and associated parts being shown in elevation;

Figure 3 is a fragmentary sectional view, on an enlarged scale, taken substantially on line 3—3 of Figure 1, certain parts being shown in elevation;

Figure 4 is a sectional view, on an enlarged scale, taken substantially on line 4—4 of Figure 2;

Figure 5 is a sectional view through the clutch assembly and associated parts, taken substantially on line 5—5 of Figure 4;

Figure 6 is a view similar to Figure 4 but showing a different relation between the parts of the clutch assembly;

Figure 7 is a fragmentary sectional view, on an enlarged scale, taken substantially on line 7—7 of Figure 4; and Figure 8 is a detail side view of the shoe clutch trip finger and the associated trip rod, the latter being broken away.

I have illustrated my invention as applied to an ironing machine comprising a gear housing 10 of suitable shape mounted upon bed plate 11 of the ironing machine and extending downward through the bed plate. A supplemental housing 12 is suitably mounted beneath housing 10 and encloses a worm wheel 13 in mesh with a worm 14 secured upon a shaft 15 driven in a suitable manner, conveniently by an electric motor. Worm wheel 13 is keyed upon a drive shaft 16 which has suitable bearing, at its lower end, in a boss 17 projecting downward from the bottom wall of supplemental casing 12.

Shaft 16 extends upward through a bushing 18 which fits through a collar 19 integral with and projecting upward from bottom wall 20 of gear housing 10. Bushing 18 is provided, at its lower end, with an outwardly projecting flange 21 confined between bottom wall 20 of casing 10 and the upper end of hub 13a of worm wheel 13.

An outer clutch member 2, comprising an upper disc 23, an intermediate cam 24 and a depending eccentric hub 25, is mounted about bushing 18 free therefrom and seats upon the upper end of collar 19. Member 22 is provided, in its upper face, with a concentric groove 23a which receives a tension coil spring 26. This spring is anchored at one end to member 22, by means of a pin 27, and the other end of spring 26 engages over a tongue 28 struck downward from a yoke member 29 in the form of a metal plate or stamping. Member 29 seats upon the upper face of disc 23, about a collar 30 projecting upward from member 22, for turning movement about the axis of shaft 16, and is free from member 22 except for the connection provided by spring 26. This provides means whereby the yoke member 29 is turned in one direction a predetermined distance relative to member 22, by the tension of spring 26, and is thereafter rotated a further predetermined distance in the same direction with member 22, as will be more fully explained hereinafter.

Yoke member 29 is provided with two oppositely related and upwardly projecting tabs 30, 30, spaced apart 180° and aligned diametrically of disc 23. Member 29 is further provided with two upwardly projecting tabs 31 and 32 aligned on a chord of disc 23. A clutch pawl 33 is pivoted on a stud 34, which is suitably secured in member 22 (Figure 7) and is provided with a flange 35 seating against the upper face of disc 23 and of slightly greater thickness than yoke member 29. A split locking ring 36, of known type, engages into a circumferential groove 37 in stud 34, immediately above pawl 33 and cooperates with flange 35 to confine the pawl against movement axially of the stud, in a known manner.

Pawl 33 comprises a hook element 38 and a tail element 39, and is disposed between tabs 31 and 32 of yoke member 29 so that hook element 38 will be contacted by tab 31 upon turning of yoke member 29 by spring 26 and relative to member 22, and tail 39 will contact tab 32 upon rotation of member 22 relative to yoke member 29.

An inner clutch member in the form of a ratchet wheel 40, provided with a squared central opening, is mounted upon squared upper portion 16a of drive shaft 16 for rotation therewith. Hook 38 of pawl 33 engages with the ratchet wheel 40, when the pawl is moved from the disengaged position shown in Figure 6 into the engaged position shown in Figure 4, thus clutching member 22 to the ratchet wheel 40 for rotation therewith.

A trip finger 41 is pivoted upon a screw stud 42 secured in the front wall of housing 10. A trip rod 43 is connected, at its lower end, to the inner end of finger 41 and extends upward therefrom through a recessed boss 44 adjacent the top of housing 10. A button 45 is secured upon the upper end of rod 43, and the latter is normally held raised by a compression coil spring 46 disposed within boss 44 and confined between the bottom wall thereof and button 45. The outer end of finger 41 is thus normally held depressed and rests upon the upper face of disc 23 in the path of travel of tabs 30 of yoke member 29, when the latter is rotated with member 22. This will be clear from Figures 1, 4 and 6. Stud 42 also provides, in conjunction with boss 47, into which this stud screws, means for adjustably supporting a holding and brake member 48. Member 48 comprises a central shank 49 which extends upward from the mid-portion of an approximately U-shaped element comprising two inwardly diverging resilient arms 50, each formed, at its free end, to provide a rounded holding element 51. Shank 49 is provided with a lengthwise slot 52 which receives the threaded shank of stud 42, the latter being provided with an enlarged hexagonal nut element 53 between which and boss 47 shank 49 is clamped. Member 48 is so adjusted that arms 50 thereof are in the plane of disc 23, with elements 51 contacting the periphery of the disc and serving to prevent rotation thereof by inertia. Disc 23 is provided with two notches 55 shaped conformably to elements 51 of the arms 50. Notches 55 are so disposed that element 51 of one of the arms 50 engages into a notch 55, after the member 22 has been turned through an arc of 180°, for holding this member in position, as shown in Figure 4.

An eccentric strap 6 fits about eccentric element 25 of member 22. This strap is formed integrally with an arm 56 at one end thereof, this arm being provided at its other end with a fork 58 in which is pivoted a block 59, by means of a pin 60. Block 59 is also pivoted, by a pin 61, to the lower end of an arm 62 which is suitably secured, as by a pin 63, to a shaft 64 rockably mounted in housing 10. The pins 60 and 61 are disposed perpendicular one to the other, providing a universal connection between arms 57 and 62. Shaft 64 is the shoe operating shaft and is intended to have associated therewith an ironing shoe and supporting means therefor effective to hold the shoe against the roll of the ironing machine, when arm 57 is moved toward the right as viewed in Figure 1, with the eccentric element 25 turned through 180° from its position shown in Figures 4 and 5. When the eccentric element 25 is in the position shown in Figures 1, 4 and 5, arm 57 has been moved toward the left and shaft 64 has been turned clockwise, as viewed in Figure 1, moving the shoe away from the roll. This operation is explained more fully in the above identified patent to Rudolph W. Janda, and need not be here illustrated nor described in greater detail.

When eccentric element 25 of member 22 approaches the limit of its movement through 180° from one operative position to the other, one of the tabs 30 contacts the trip finger 41 and the yoke member 29 is held against turning movement. In the continued rotation of member 22 with the ratchet wheel 40, tail 39 of pawl 33 is brought into contact with tab 32, thus turning the pawl in clockwise direction, as viewed in Figure 6, and disengaging it from ratchet wheel 40, effecting the declutching operation. Turning of member 22 relative to yoke 29 also serves to place the spring 26 under tension, it being noted that member 22 turns clockwise with ratchet wheel 40, as viewed in Figures 4 and 6, and as indicated by the arrows in these figures. In Figure 4 it is assumed that arm 57 has been moved to the left and shaft 64 has been turned clockwise, moving the shoe away from the roll, and that trip finger 41 has been raised out of engagement with the adjacent tab 30. This releases the yoke member 29, which is immediately turned in a clockwise direction, by the spring 26, bringing tab 31 into contact with hook element 38 of pawl 33, thus turning the pawl in a counterclockwise direction into engagement with ratchet wheel 40. This effects the clutching operation and member 22 now rotates with drive shaft 16 and ratchet wheel 40 so as to move arm 57 toward the right and rock shaft 64 in counterclockwise direction, as viewed in Figure 1, moving the shoe to the roll. In order to effect release of yoke member 29 rod 43 is but momentarily depressed and is then released, returning the outer end of finger 41 to its normal lowered position. As arm 57 reaches the limit of its movement toward the right, the outer tab 30 of yoke 49 contacts trip finger 41, holding the yoke against rotation with member 22, and in the continued rotation of the latter member tail 39 of pawl 33 contacts tab 32 and the pawl is turned clockwise into the position shown in Figure 6, thus effecting the declutching operation. In this position of the pawl the hook 38 thereof is disposed to clear the teeth of ratchet wheel 40, as is tail 39 of the pawl, thus eliminating possibility of chattering or clicking due to contact of these parts. In the event tail 39 should move into the path of the teeth of ratchet wheel 40, in the declutching operation, it will be moved outward by contact of the teeth without objectionable noise, since this tail is curved at its inner side on substantially the same radius as the teeth of the ratchet wheel, and will remain in its outer position so long as the parts are declutched one from the other. As the declutching operation is completed, element 51 of one of the arms 50 engages into the adjacent notch 55 of disc 23, thus holding member 22 against further rotation. Eccentric element 25 is thus held in dead center position relative to arm 62 and shaft 64, in both of its operative positions, and is thus effectively maintained against turning under the influence of the pressure exerted either by the weight of the shoe or by the spring associated with the shoe for applying the latter to the roll under spring pressure. This is advantageous, particularly if there is any inaccuracy or looseness of fit between the eccentric element 25 and the eccentric strap 56, due to wear or other causes, which looseness or inaccuracy might have a tendency to cause turning of member 22 beyond its proper position.

The cam element 24 of member 22 actuates a release lever 65 for starting and stopping the roll drive in accordance with movement of the shoe to and from the roll. The lower end of lever 65 is maintained in contact with cam element 24, as shown. Lever 65 is pivoted, adjacent its upper end, by means of a pin 66, on a bracket 67 removably secured to a thickened web element 68 of housing 10. An operating lever 69 is also pivoted on bracket 67, by means of pin 66, and bears, adjacent its upper end, against the outer end of a spring pressed plunger 70 slidable in a sleeve 70a keyed to the outer end of roll shaft 71, which shaft extends through a boss 72—72a projecting from the inner face of inner wall 73 of housing 10. The inner portion of sleeve 70a extends into boss 72—72a. Shaft 71 extends through a supporting sleeve 74 secured in a boss 75 projecting from the outer face of wall 73 and aligned with boss 72—72a. An ironing roll (not shown) is mounted upon boss 75 and shaft 71 for rotation with the latter, upon which it is removably secured, conveniently in the same manner as disclosed in the above identified patent to Rudolph W. Janda. By detaching the roll from shaft 71, the latter may be slid lengthwise through boss 72 toward the outer side of housing 10.

A bevel gear 76 is loosely mounted upon sleeve 70a at the outer end of boss 72. This gear is provided with a hub 77 the outer portion of which is formed to provide a spur pinion 78 projecting outward from the hub. A ring member 79 is mounted for relative turning movement on hub 77 and is provided with a plurality of teeth defining an internal gear 80. Member 79 is further provided, beyond internal gear 80, with a plurality of teeth providing an internal clutch element 81 and, adjacent its inner end, with a plurality of teeth providing an external ratchet element 82. A disc 83 is secured upon the squared outer end portion of sleeve 70a in a suitable manner, as by means of a set screw 84 which screws through hub 85 of the disc and engages into corresponding recess in the sleeve.

Plunger 70 is urged outward by a coil compression spring 85 confined between the plunger and the outer end of shaft 71. The plunger is provided with an outwardly tapering frusto-conical element 86 and a reduced tip element with which the lever 69 contacts. The body portion of plunger 70 is cylindrical and, in the outer position of the plunger, contacts the inner ends of two clutch dogs 87 slidably mounted in bosses 88 and 89 formed integrally with hub 83a of disc 83 and with disc 83, respectively, these bosses and the dogs being aligned diametrically of the disc. Hub 83a and sleeve 70a are provided with aligned bores which slidably receive the inner end portions of the dogs. When the dogs are projected, the outer ends thereof, which are tapered correspondingly to the teeth of clutch element 81, engage between the teeth of this clutch element and clutch disc 83 and ring member 79 together for rotation as a unit. An arcuate wire spring 90 passes loosely through bores through the dogs 87 and yieldingly urges these dogs toward each other while also holding them against turning movement. When the plunger 70 is moved inward into its inoperative position shown in Figure 2, spring 90 acts to retract the dogs and move them into inoperative position, shown in Figure 1, at which time the disc 83 and the ring member 79 are free for relative turning movement. Under such conditions the roll shaft 71 will not be rotated, even though the bevel gear 76 is driven.

By moving the upper end of the control or operating lever 69 outward, permitting corresponding outward movement of plunger 70, dogs 87 are projected, clutching disc 83 and ring member 79 together for rotation as a unit. Under such conditions, relative rotation between the disc 83 and the ring member 79 is prevented so that the disc is locked to pinion 78 for rotation therewith, through pinions 91 mounted for rotation on studs 92 suitably secured in disc 83, pinions 91 meshing with pinion 78 and internal gear 80 of the ring structure 79. This provides a direct drive between bevel gear 76 and roll shaft 71 for driving the latter at high speed.

When disc 83 is declutched from ring member 79 and the latter is free to rotate, ring member 79 is rotated in a counter-clockwise direction, as viewed in Figure 1, through pinions 78 and 91, it being understood that bevel gear 76 is driven in a clockwise direction, and roll shaft 71 is not driven. If now ring member 79 be held against rotation counterclockwise, disc 83 will be driven clockwise at low speed, through pinions 78 and 91 and the internal gear 80, thus driving the roll shaft 71 at low speed. For this purpose a pawl 93 is pivoted on bracket 67 and is urged, by a wire spring 94, toward the ring member 79. When roll shaft 71 is driven at high speed, or is not driven, pawl 93 is held in the inoperative position shown in Figure 1. In order to drive the roll shaft 71 at low speed, pawl 93 is released and engages a tooth of the external ratchet element 82 of ring member 79, holding the latter against rotation counterclockwise and producing low speed drive of the roll shaft, as above explained.

The position of the operating lever 69 and the pawl 93 may be manually adjusted by means of a cam member 95 mounted upon the flat inner end portion 96a of a control rod 97 rockably mounted through the front wall of housing 10 and through a suitable tab of bracket 67. A suitable lever 98 is secured upon the outer end of rod 97 and is movable in front of an index on the housing wall bearing the notation "Fast", "Stop" and "Slow". In the "fast" position of lever 98 the lower end of the operating lever 69 is permitted to move inward, with corresponding outward movement of the upper end thereof and of plunger 70, which results in clutching disc 83 and ring member 79 together for high speed drive in the manner previously described. In the "stop" position of lever 98, cam member 95 is so disposed that the lower end of operating lever 69 is forced outward, thus forcing the plunger 70 inward and declutching disc 83 from ring member 79, and pawl 93 is held out of engagement with the external ratchet element 82 of ring member 79, permitting the latter to rotate counterclockwise so that rotation of roll shaft 71 does not occur. When lever 98 is turned into "slow" position, the lower end of operating lever 69 is maintained in its outer position and the pawl 93 is released and is moved into operative position by spring 94 so as to hold ring member 79 against rotation counterclockwise, thus driving the roll shaft 71 at low speed.

A set screw 100 is suitably secured through release lever 65, adjacent the upper end thereof, in position to contact operating lever 69 above pivot pin 66. This permits of manual operation of lever 69 independently of release lever 65 while assuring that the lower end of the latter lever is held in contact with cam element 24 of member 22 by the pressure exerted by spring 85, through plunger 70 and operating lever 69. When the cam element 24 is in the position shown in Figures 4 and 5, the lower end of lever 65 is in contact with the high point of the dwell of cam element 24 and the upper end of operating lever 69 is forced inward, declutching disc 83 from ring member 79 and stopping drive of shaft 71 if the parts are set for high speed or "fast" drive of this shaft, as above explained. Release lever 65 is further provided with a trip finger 101 disposed to contact shoulder 102 of pawl 93 so as to move the latter into its inoperative position when the lower end of lever 65 is moved outward by cam element 24, if the parts are set for low or "slow" speed drive of shaft 71. It will thus be seen that the release lever 65 is effective for stopping drive of the roll shaft 71, when the shoe is moved away from the roll, if the control cam 95 is set for either "fast" or "slow" drive of shaft 71. Upon turning of cam element 24 through 180°, with corresponding movement of the shoe to the roll, the release lever 65 becomes ineffective and the roll shaft 71 is driven at either high or low speed, or is not driven, according to the position of the cam member 95.

A shaft 103 is rotatably mounted through a bushing 104 suitably secured through web element 68. A bevel pinion 105 is secured upon the upper end of shaft 103 and meshes with bevel gear 76 for driving the latter. The lower portion of shaft 103 is squared at 104a and fits into a corresponding bore 105a extending from the upper end of a coupling member 106. Bore 105a opens, at its lower end, into an enlarged square bore 107, extending from the lower end of coupling member 106 and snugly receiving the squared upper end portion 16a of shaft 16. Preferably, coupling member 106 is secured upon portion 16a of shaft 16 by a set screw 108. A spacing member 109 is disposed between the lower end of coupling member 106 and the upper face of ratchet wheel 40. The shafts 16 and 103 are disposed coaxially with their adjacent ends spaced apart as shown. By moving the roll shaft 71 a short distance toward the right, as viewed in Figure 2, as indicated by the arrow a, so as to move bevel gear 76 and ring member 79 outward into the positions indicated by dot and dash lines, pinion 105 may be raised into the dot and dash position indicated with corresponding upward movement of shaft 103, as indicated by the arrow b. When shaft 103 is thus raised the distance between the lower end of this shaft and the upper end of shaft 16 is slightly greater than the length of the coupling member 106 so that, by loosening set screw 108, this coupling member may be slid upward off of portion 16a of shaft 16 and removed therefrom. After this has been done, with shaft 103 remaining in its raised position, spacing member 109 may be removed from squared portion 16a of shaft 16, and the clutch assembly, including the member 22, the yoke member 29 and, if desired, the ratchet wheel 40, may be slid upward along squared portion 16a of shaft 16 and removed therefrom as a unit, it being noted that the height of this assembly is somewhat less than the length of the coupling member 106. Obviously, if desired, the ratchet wheel 40 may be first removed and the remainder of the clutch assembly then removed as a unit, if desired. Prior to removal of the clutch assembly the trip finger is removed. This may be readily accomplished by screwing the stud 42 out of boss 47 and then raising the trip finger and associated parts, by means of the rod 43, into such position as not to interfere with removal or replacement of the clutch assembly. Also, if desired, the bracket 67 and the parts carried thereby may be removed as a unit, so as to give unobstructed access to the lower portion of housing 10 for removal or replacement of the clutch assembly, though this is not necessary.

I claim:—

1. In ironing machine clutch means of the character described, an inner clutch member, an outer clutch member, a pawl pivoted on said outer member for movement into and out of engagement with said inner member, a yoke member on said outer member, a tension spring connecting said yoke member to said outer member for turning therewith, said yoke member being otherwise free from said outer member and provided with two tabs spaced approximately 180° apart, and a trip finger normally disposed to contact said tabs in the rotation of said yoke member with said outer clutch member and movable into inoperative position to release said yoke member, the latter being further provided with pawl operating means disposed to move said pawl into and out of engagement with said inner clutch member in accordance with the turning of said yoke member relative to said outer clutch member by the tension of said spring and the turning of said outer clutch member relative to said yoke member.

2. In ironing machine clutch means of the character described, an inner clutch member, an outer clutch member, a pawl pivoted on and spaced above the upper face of said outer member for movement into and out of engagement with said inner member, said pawl comprising a hook element and a tail element projecting oppositely from its pivot, a yoke member mounted on the upper face of said outer member and turnable about the axis of said inner member, said yoke member being provided with two upwardly projecting tabs, one disposed to contact the hook element of said pawl and move the latter into engagement with said inner clutch member upon turning of said yoke member in one direction relative to said outer clutch member and the other disposed to contact the tail of said pawl and move the latter into disengaged position upon turning of said outer member relative to said yoke member, the latter being further provided with two stop tabs disposed approximately 180° apart, a releasable trip finger normally disposed for contact with said stop tabs, and a tension spring connecting said yoke member to said outer clutch member for rotation therewith, said spring being disposed to be tensioned by the turning of said outer clutch member relative to said yoke member.

3. In ironing machine clutch means of the character described, a continuously rotating drive shaft, a ratchet wheel mounted on said shaft for rotation therewith, an outer clutch member turnable about the axis of said shaft normally free therefrom and releasably held in predetermined angular relation thereto, a pawl pivoted on said outer member for movement into and out of engagement with said ratchet wheel, a yoke member, yielding means connecting said yoke member to said outer clutch member for turning therewith and relative thereto, and means for releasably holding said yoke member against turning with said outer clutch member and in predetermined angular position thereto in opposition to said yielding means, for moving said pawl into and out of engagement with said ratchet wheel in accordance witth the turning of said yoke member relative to said outer clutch member and the turning of the latter relative to said yoke member.

4. In ironing machine clutch means of the character described, a continuously rotating drive shaft, a ratchet wheel mounted on said shaft for rotation therewith, an outer clutch member turnable about the axis of said shaft normally free therefrom and releasably held in predetermined angular relation thereto, a pawl pivoted on said outer member for movement into and out of engagement with said ratchet wheel, a yoke turnable about the axis of said shaft, yielding means connecting said yoke member to said outer clutch member for turning therewith and relative thereto, and means for releasably holding said yoke member against turning with said outer clutch member and in predetermined angular position thereto in opposition to said yielding means, for moving said pawl into and out of engagement with said ratchet wheel in accordance with the turning of said yoke member relative to said outer clutch member and the turning of the latter relative to said yoke member.

5. In ironing machine clutch means of the character described, a drive shaft, a ratchet wheel mounted on said shaft for rotation therewith, an outer clutch member turnable about the axis of said shaft and normally free therefrom, a pawl pivoted on said outer member for movement into and out of engagement with said ratchet wheel, a yoke turnable about the axis of said shaft, yielding means connecting said yoke member to said outer clutch member for turning therewith and relative thereto, means for releasably holding said yoke member against turning with said outer clutch member and in predetermined angular position thereto in opposition to said yielding means, for moving said pawl into and out of engagement with said ratchet wheel in accordance with the turning of said yoke member relative to said outer clutch member and the turning of the latter relative to said yoke member, and means normally holding said outer clutch member against turning and in predetermined angular relation to said yoke member.

EDWARD B. CARSON.